Aug. 6, 1929.  J. W. WESLEY  1,723,829
AUTOMATIC WEIGHING SCALE
Original Filed June 5, 1926  3 Sheets-Sheet 1

Inventor:
John W. Wesley
By Chas. E. Tillman
Atty.

Aug. 6, 1929.  J. W. WESLEY  1,723,829
AUTOMATIC WEIGHING SCALE
Original Filed June 5, 1926   3 Sheets-Sheet 2

Inventor:
John W. Wesley
By Chas. C. Tillman
Atty.

Aug. 6, 1929.  J. W. WESLEY  1,723,829
AUTOMATIC WEIGHING SCALE
Original Filed June 5, 1926   3 Sheets-Sheet 3
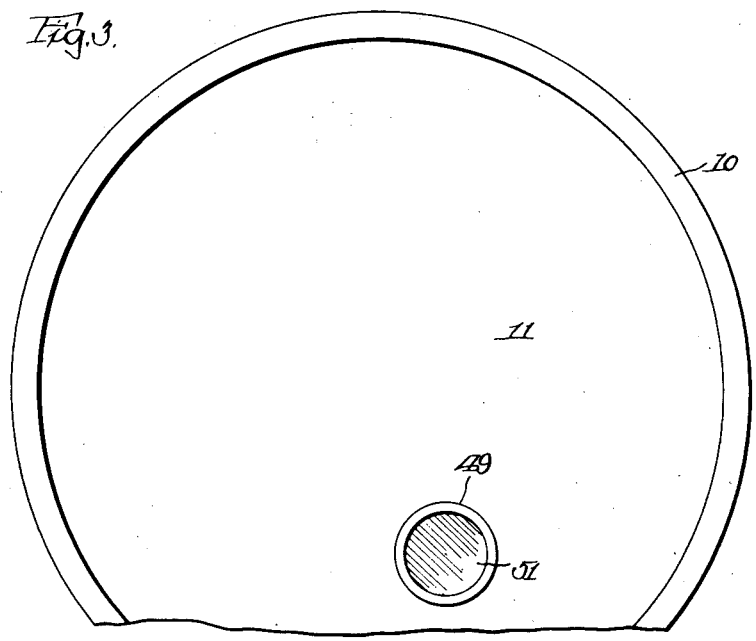
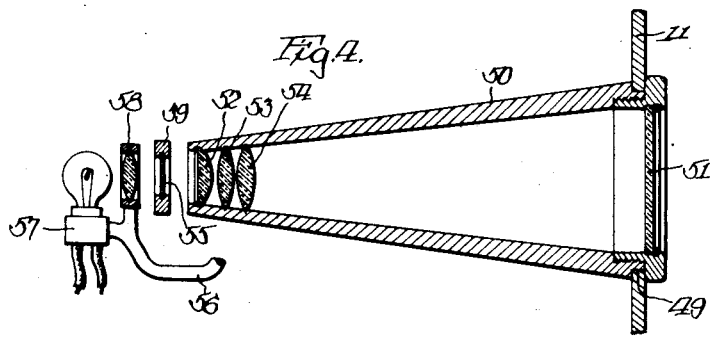
Inventor:
John W. Wesley
By Chas. C. Tillman
Atty.

Patented Aug. 6, 1929.

1,723,829

UNITED STATES PATENT OFFICE.

JOHN W. WESLEY, OF CHICAGO, ILLINOIS.

AUTOMATIC WEIGHING SCALE.

Application filed June 5, 1926, Serial No. 113,865. Renewed February 10, 1927.

Broadly speaking, this invention relates to weighing scales, but more particularly to the automatic type thereof, and is especially directed to a weight-indicating mechanism employed in such scales.

The principal object of the invention is, to provide an automatic weighing scale with an automatically operated weight-indicating mechanism, of such construction, arrangement and combination of its parts as to at all times afford an efficient, accurate and clearly visible weight-indicator, which shall display to the view of the operator, or others, in plain or bold indicating characters, the correct weight of the article or articles being weighed, no matter if light or heavy, so long as the same is within the boundary of a reasonable limit.

Another object of the invention is, to provide an automatically operated weight-indicating mechanism which is operated independently of the pendulum of the weighing mechanism, through an independent beam or lever, which is connected to and operated by a movable part of the scale mechanism.

Another and further object of the invention is, to provide an automatically operated weight-indicating mechanism which can be adjusted independently of the weighing mechanism to correctly indicate therewith, and which may be adjusted to indicate and weigh an article from the most minute, to one nearly to the breaking point of the scale.

Still another object of the invention is, to provide an automatically operated weight-indicating mechanism, which is independent of the weighing pendulums, but co-acting therewith, so that the graduated scale may be provided with any number of graduations, and also of the long or short type, having provision made by the independent adjustment, for any movement of the said graduated scale.

A still further object of the invention is, to construct a scale that may be set on a slight incline, whereby the parts will right themselves and perfect accuracy of the scale be maintained.

In the manufacture of automatic weight-indicating scales of this type, the graduated scale is operated with the weighing pendulum and in so far as the pendulum only moves a given distance, the graduated scale can only move the same distance, and it has been found very unsatisfactory, inasmuch as only a given amount of graduations can be made in the indicator scale as to be legible through the ground glass or screen.

Other objects and advantages of the invention will be more clearly pointed out in the appended claims and illustrated in the accompanying drawings, in which, Fig. 1, is a rear elevation of the scale with the rear plate removed to show the working parts.

Fig. 3, is a face view of the top portion of the scale to show the ground glass on which the characters appear.

Fig. 4, is a longitudinal sectional view of the scale projecting means.

The same reference characters indicate the same parts in all the figures of the drawings.

Figure 1:
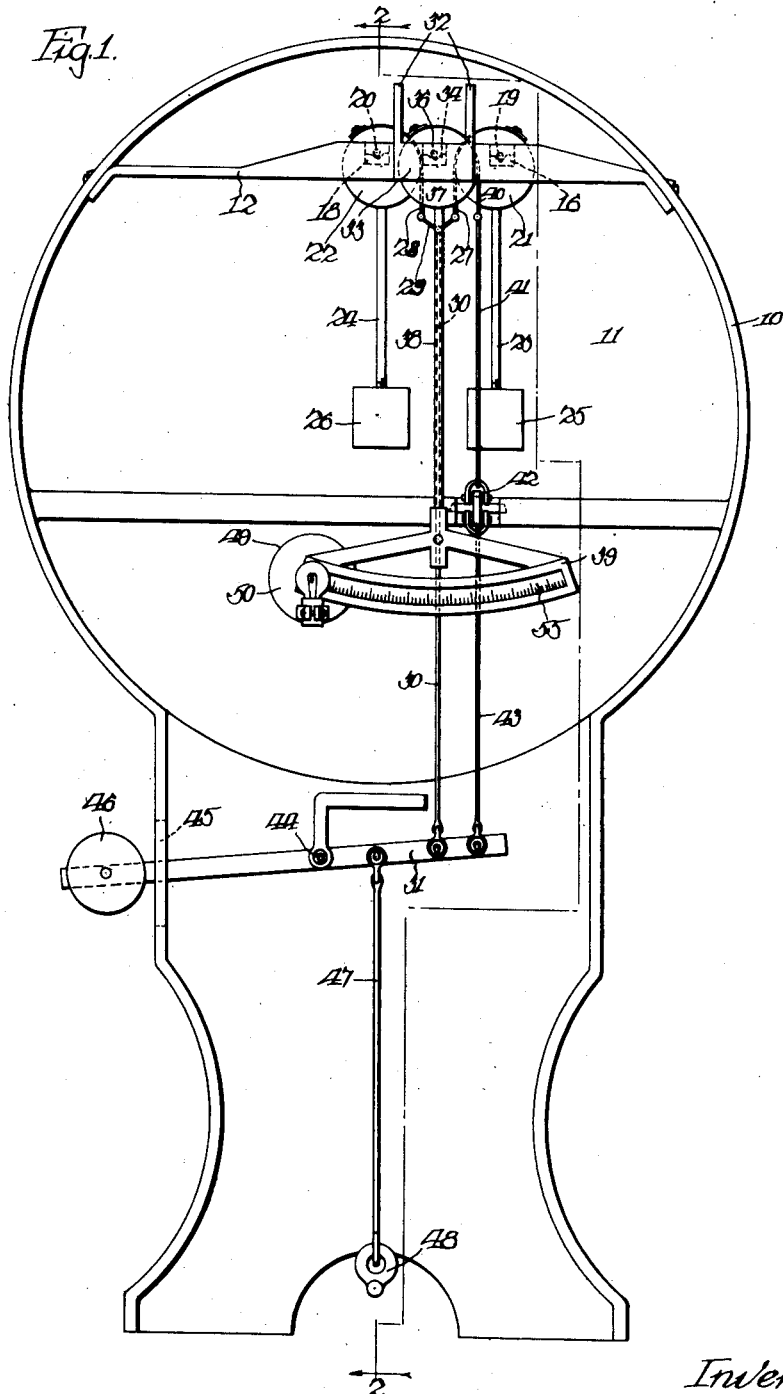
Figure 2:
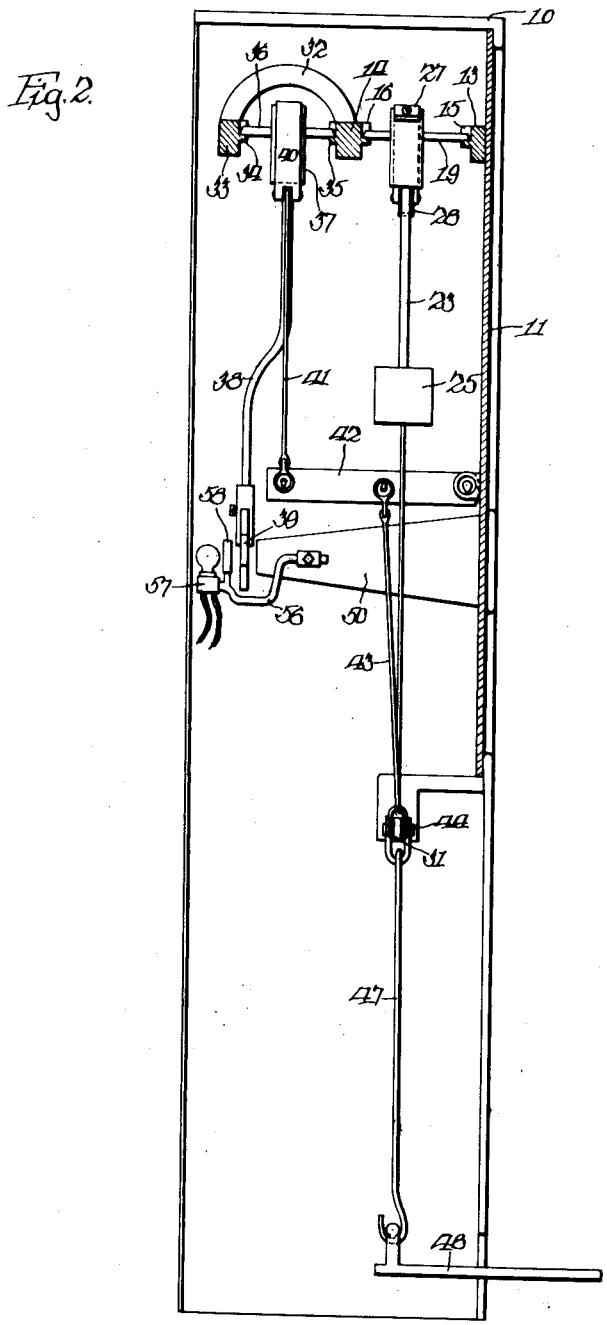
Fig. 2, is a vertical sectional view taken on the line 2, 2, of Fig. 1.

The reference numeral 10, designates the housing, which surrounds the operating parts, having the front face 11, secured to each side of the housing 10. Adjacent the top is the cross frame 12, which has the two spaced apart parallel side members 13, and 14, and which is provided with anti-friction bearings 15, 16, and 17, 18. Mounted for pivotal movement in the bearings 15, 16, and 17, 18 is a pair of horizontally disposed shafts 19, and 20, with the discs 21, and 22, fixed eccentrically thereon, with the greater distance depending from their respective shafts, and which discs have the rods 23, and 24, depending therefrom and provided with the weights 25, and 26, which will be hereinafter referred to as pendulums. The discs 21, and 22, have the tapes 27, and 28, secured to their upper faces, and follow the contour of the discs and depend a short distance. Pivotally mounted to the two depending tapes 27, and 28, is an equalizing connection 29, which has the rod 30, pivoted thereto, and extending downwardly to the beam 31, and hereinafter more fully described.

The side member 14, has extending outwardly therefrom a pair of arcuate arms 32, which terminate into a cross frame 33, the inner side of which is provided with an anti-friction bearing 34, corresponding with the anti-friction bearing 35, provided on the outer side of the side member 14. Mounted for pivotal movement in the bearings 33, and 34, is a horizontally disposed shaft 36, which is also provided with a disc 37, eccentrically thereon, and has a rod 38, depending therefrom, which has the arcuate graduated scale carrying frame 39, adjustably fixed to its lower end. The disc 37, has a tape 40 or other suitable flexible member, secured to its upper face and follows the contour of the disc and has the rod 41, extending downwardly, having its lower end pivotally mounted to and intermediate the horizontal beam 42, the same being pivoted to the front face 11. Pivotally mounted intermediate the horizontal beam 42, is a downwardly depending rod 43, which is pivotally mounted at its lower end to the extreme end of the beam 31, said beam being pivotally mounted as at 44, and extending outwardly through a slot 45, in the housing and provided at its outer end with an adjustable weight 46. Pivotally mounted to the beam 31, intermediate the rod 30, and the pivot 44, is a depending rod 47, which is pivotally mounted to the scale platform 48. The front face 11, is provided with an opening 49, to receive a tapered tubular member 50, which is provided at its front end with a ground glass or other suitable material 51, secured in any suitable way, and which is provided at its rearward end with a plurality of projecting lenses 52, 53, and 54. Adjacent the projecting lens 52, is the scale carrier which has the transparent material 55, such as glass, or the like fixed thereto, and which has printed thereon, a graduated scale. The scale 55, may be adjusted with respect to the projecting lenses 52, 53, and 54, by movement of its frame 39, on the rod 38. Supported on the tapered tubular member 50, is an arm 56, which has a clamp portion 57, and a condensing lens 58. At the extreme end of the arm 56, is clamped an electric lamp and socket, which may be adjusted for alignment with respect to the graduated scale, and the parts may be adjusted with respect to each other for the purpose of obtaining perfect projection of the graduations on the ground glass. It will be seen that in this construction the scale may be adjusted through the pendulums, that is the weights 25, and 26, may be adjusted on the rods 23, and 24, and the scale be balanced absolutely accurately independent of the graduated indicating scale referred to as 55, in this manner the scale 55, may also be adjusted independently of the pendulums 25, and 26, and the weighing mechanism and the indicating mechanism can be adjusted so as to work absolutely accurately.

In the operation a load placed on the scale platform 48, will pull on the link or rod 47, and the beam 31, which beam will rock on the pivot 44, and will pull down on the rods 30, and 43. The rod 43, which is in the extreme end of the beam 31, and connected to the intermediate beam 42, intermediate the pivotal point and its extreme end will draw down on the rod 41, which has its upper end attached to the tape 40, of the indicating member. It will be seen, in this particular construction, that by so connecting the rod 43, to the beam 42, at any given distance from the pivotal point and connecting the rod 41, outwardly of the beam 42 any movement of this beam will in turn cause the scale to be moved at any distance which may be pre-determined and the movement of the scale platform 48, will not be increased with respect to the movement of the indicator.

As is clearly shown in Fig. 1, of the drawings the scale is rocked on its axis 36, and the scale is arced so as to be at all times in the path of the tapered tubular member 50, and when a load is placed upon the scale platform the scale will be moved and the rays of light of the electric lamp will be thrown forwardly through the condensing lens 58, thence through the transparent member 55, having the graduated scale and which is in direct alignment with the centers of the projecting lenses and will cause the marks on the scale 55, to be greatly enlarged and projected onto the ground glass 51.

In the particular construction of the scale projecting device, it has been found that the use of three projecting lenses 52, 53, and 54, located at the inner end of the tubular member 50, will give added strength for the purpose of projecting the figures, and marks of the scale and in this manner it is possible to make a projecting means which is very short and compact and reduces greatly the thickness of the scale housing.

Having thus fully described my invention what I claim as new and desire to secure by Letters Patent is:—

1. In a scale of the class described the combination of a weighing means, said means comprising pendulums, of a transparent graduated scale, said scale being pivoted independently of said weighing means, a ground glass, a source of light in the path of travel of said graduated scale, said source of light for projecting the marks of said graduated scale on said ground glass, and operating means co-acting with said weighing means and said transparent graduated scale to effect greater movement of one with respect to the other.

2. In a scale of the class described the combination of a weighing means, said means comprising pendulums, of a transparent graduated scale, said scale being pivoted independently of said weighing means, a ground glass, a source of light in the path of travel of said graduated scale, said source of light for projecting the marks of said graduated scale on said ground glass, an intermediate beam, weight operating means, and means connected to said weight means for effecting movement of said intermediate beam.

3. In a scale of the class described the combination of a weighing means, said means comprising pendulums, of a transparent graduated scale, said scale being pivoted independently of said weighing means, a ground glass, a source of light in the path of travel of said graduated scale, said source of light for projecting the marks of said graduated scale on said ground glass, an intermediate beam, weight operating means, and means connected to said intermediate beam, to effect movement of said transparent graduated scale a greater distance than said weighing means.

4. In a scale of the class described, the combination of a weighing means, said means comprising a pendulum, of a transparent indicating scale having graduations thereon, said scale being pivoted independently of said weighing means, a translucent screen located at one side of the path of travel of said scale, a source of light located on the other side of said scale in the path of travel of the same and in alignment with said screen, said source of light for projecting the characters of said scale onto said screen, and operating means co-acting with said weighing means and said scale to effect greater movement of one with respect to the other.

5. In a scale of the class described, the combination with a weighing means, said means comprising counter-balancing means, of a weight indicating scale having graduations thereon, said scale being pivoted independently of said weighing means, a translucent screen located at one side of the path of travel of said scale, a source of light located on the other side of said scale in the path of travel of the same and in alignment with said screen, projecting lenses located between the screen and the path of travel of the same, said lenses being in alignment with each other, said screen and said source of light, and operating means co-acting with said weighing means and said scale to effect greater movement of one with respect to the other.

6. In a scale of the class described the combination of a weighing means, of a transparent graduated scale, pivoted independently of said weighing means, a ground glass, a source of light in the path of travel of said transparent graduated scale for projecting the marks of said scale on said ground glass, operating means for effecting movement simultaneously of said weighing means, and said scale, effecting greater movement of one with respect to the other.

7. In a scale of the class described, the combination of a weighing means, said means comprising pendulums, of a graduated scale, said scale being operated independently of said weighing means, and weight operating means separately co-acting with said weighing means and said graduated scale to effect greater movement of one with respect to the other.

8. In a scale of the class described, the combination of a weighing means, said means comprising pendulums, of a graduated scale, said scale being pivoted independently of said weighing means, an intermediate beam operably connected to said pendulums and said scale, weight operating means, and means connected to said weight operating means for effecting movement of the intermediate beam.

9. In a scale of the class described, the combination of a weighing means, said means comprising pendulums, of a scale pivoted independently of said weighing means, an intermediate beam operably connected to said weighing means, weight operating means, means connecting said weight operating means with said beam, and means connected to said intermediate beam and said scale to effect movement of said scale a greater distance than said weighing means.

10. In a device of the class described, the combination with a weighing means including pendulums, of a graduated scale, a balancing beam, weight operating means for said beam, and means including independent connections leading from said beam to said pendulums and said scale for independently operating said pendulums and said scale.

11. In a device of the class described, the combination with weighing means including pendulums, of a graduated scale, weight operating means, independent connections between said weight operating means and said pendulums and said scale, and means in said scale connection for imparting greater movement to said scale.

12. In a device of the class described, the combination with weighing means including pendulums, of a graduated scale, weight operating means, independent connections between said weight operating means and said pendulums and said scale, and a pivotally mounted beam, in said scale connection for imparting greater movement to said scale.

JOHN W. WESLEY.